Jan. 3, 1950  LE ROY SMELKER  2,493,368
CAR CABIN

Filed June 22, 1945  2 Sheets-Sheet 1

INVENTOR.
LE ROY SMELKER
Toulmin & Toulmin
ATTORNEYS

Jan. 3, 1950     LE ROY SMELKER     2,493,368
CAR CABIN
Filed June 22, 1945                                 2 Sheets-Sheet 2
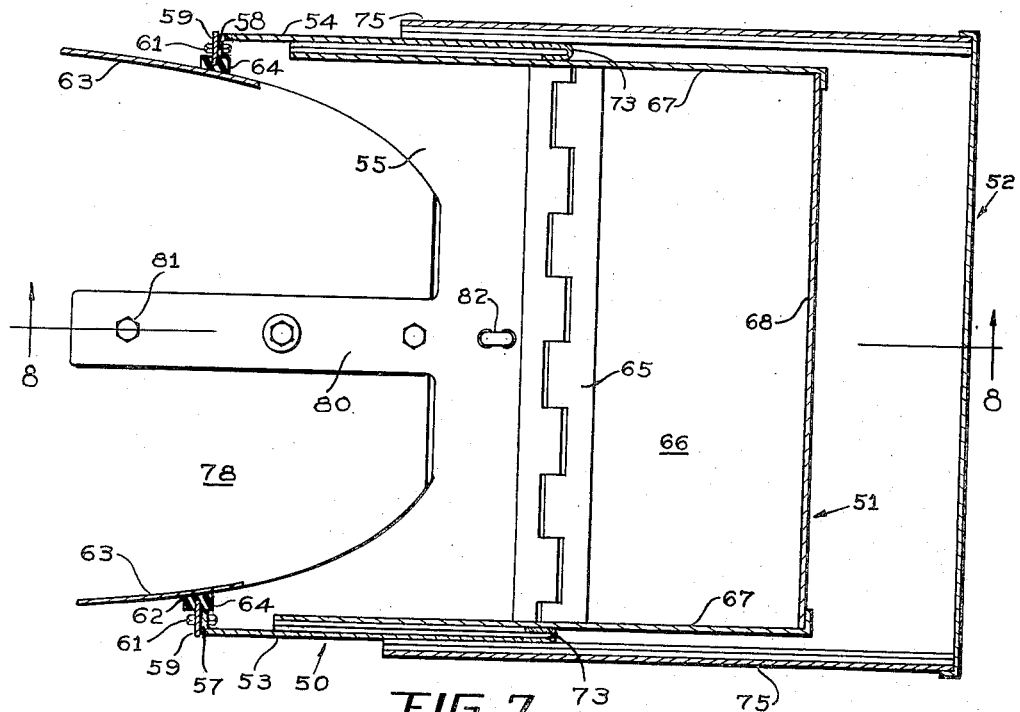
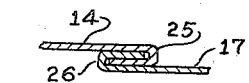
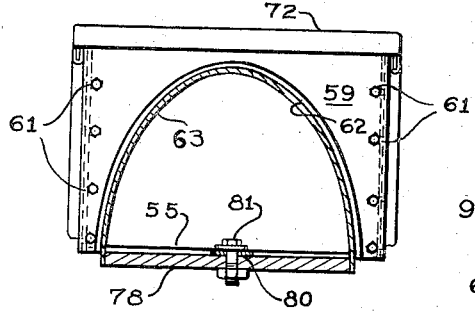
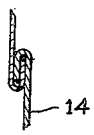
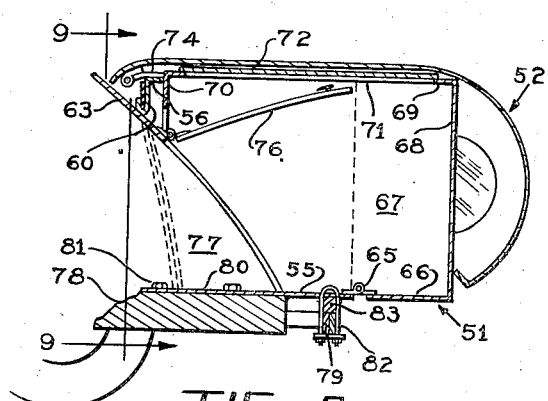
INVENTOR.
LE ROY SMELKER
BY
Toulmin & Toulmin
ATTORNEYS Patented Jan. 3, 1950

2,493,368

UNITED STATES PATENT OFFICE 2,493,368

CAR CABIN

Le Roy Smelker, Dayton, Ohio, assignor of one-eleventh to Helen May Smelker, one-eleventh to Roy David Smelker, one-eleventh to Dorothy Smelker, one-eleventh to James David Smelker, one eleventh to Linda Kay Smelker, one-eleventh to David Bench, one-eleventh to Helen Virginia Bench, one-eleventh to Thomas Edward Bench, one-eleventh to Paul Frederick Bench, and one-eleventh to Martha Jeane Bench Application June 22, 1945, Serial No. 601,018

7 Claims. (Cl. 296—26)

1

This invention relates to a portable cabin that is adapted to be carried either in or upon a passenger vehicle.

An object of the invention is to provide a portable cabin that can be folded into a convenient package so that it can be carried upon the rear part of a passenger vehicle.

Another object of the invention is to provide a portable cabin that can be carried upon the rear portion of a passenger vehicle and be attached to the vehicle in such a manner that the weight of the cabin is carried entirely by the vehicle.

Still another object of the invention is to provide a portable sleeping cabin that can be folded into a relatively small space so that it can be carried upon the rear part of a vehicle when the cabin is not in use, and can be readily unfolded for use while still attached to the vehicle.

Still another object of the invention is to provide a portable cabin in accordance with any of the foregoing objects wherein the cabin is so positioned at the rear of the vehicle that the interior of the baggage space normally provided in the rear part of a passenger vehicle can be utilized, and become a part of the cabin space when the cabin is in position for use.

Still another object of the invention is to provide a portable car cabin in accordance with any of the foregoing objects wherein the cabin can be carried within the baggage compartment provided at the rear of a passenger vehicle, and is adapted to telescope into the baggage compartment when the cabin is in folded condition, and can be readily partially removed from the baggage compartment and arranged in an unfolded condition for use so that the car cabin together with the interior of the baggage compartment forms a sleeping and dressing compartment.

Still another object of the invention is to provide a car cabin in accordance with any of the foregoing objects wherein the cabin is constructed and arranged as an accessory that can be attached to the rear of a conventional passenger car in such a manner that the interior of the baggage compartment can be utilized to supplement the car cabin to provide sleeping quarters of the desired length.

Still another object of the invention is to provide a car cabin in accordance with the foregoing object wherein a wall of the car cabin is adapted to telescope over the rear portion of a passenger vehicle, and which wall is a removable template adapted to be changed according to the contour of the passenger vehicle to which the car cabin is adapted to be attached.

2

Still another object of the invention is to provide a collapsible car cabin adapted to be carried within the baggage compartment of a passenger vehicle.

Another object of the invention is to provide a collapsible car cabin adapted to be associated with the baggage compartment of a passenger vehicle to utilize the baggage compartment as a part of the interior of the cabin, and which cabin is extensible to obtain the required height to permit persons to stand vertically within the car cabin.

Another object of the invention is to provide a collapsible car cabin in accordance with the foregoing object that is provided with sufficient space for habitation either when used for a sleeping chamber or a dressing chamber.

Further objects and advantages will become apparent from the drawings and the following description.

In the drawings:

Figure 5 is a vertical cross-sectional view taken along line 5—5 of Figure 2 to illustrate an overlapping joint provided at this point.

Figure 6 is a horizontal cross-sectional view taken along line 6—6 of Figure 2 illustrating an over-lapping joint provided between the side wall sections of the car cabin.

Figure 7 is a horizontal cross-sectional view of a car cabin of the general type illustrated in Figure 1, but which is constructed and arranged to be used as an auxiliary piece of equipment that can be attached to the rear of a conventional automobile.

Figure 8 is a vertical cross-sectional view taken substantially along line 8—8 of Figure 7.

Figure 9 is a vertical cross-sectional view taken substantially along line 9—9 of Figure 8.

Figure 1:
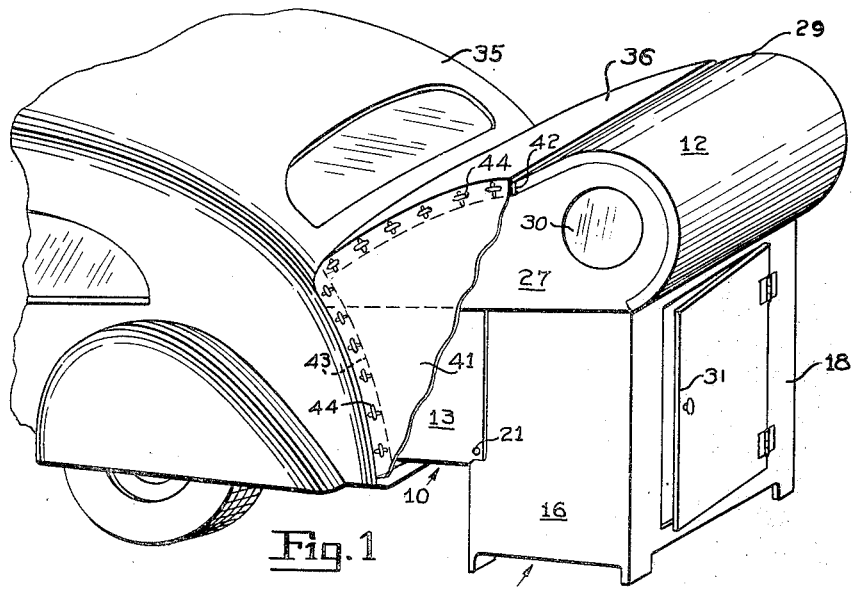
Figure 1 is a perspective elevational view of the car cabin of this invention placed in association with the baggage compartment of a passenger vehicle, and is illustrated in the extended or habitable position.

In this invention the car cabin consists of three main sections that are movable relative to one another to allow the sections to be folded into one another, or telescoped, to reduce the size of the car cabin when it is not in use. These main sections consist of a horizontal body section 10, a vertical dressing chamber section or vestibule section 11, and a top closure or top section 12.

The horizontal body section 10 is, generally speaking, U-shaped in transverse cross-section having side walls 13 and 14 and a bottom wall 15.

The dressing chamber section 11 is, generally speaking, rectangular in transverse cross-section and consists of the side walls 16 and 17, a front wall 18 having a door 31 therein, a rear wall 19 and a bottom wall 20, the top wall of the section 11 being open. The section 11 is pivotally attached to the side walls 13 and 14 of the body section 10 by means of the pivot pins 21 and 22 that extend through the walls 13, 16 and the walls 14, 17 respectively. These pivot pins 21 and 22 allow rotation of the cabin section 11 from a position illustrated in Figures 1 and 2 into a horizontal position illustrated in Figure 3, thus providing for a telescoping of the upper portion of the section 11 into the section 13 with the side walls of the respective sections lying adjacent one another.

Figure 2:
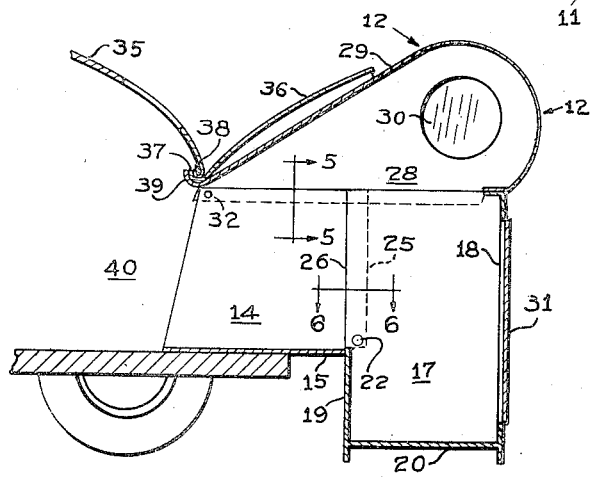
Figure 2 is a vertical cross-sectional view of the car cabin taken longitudinally of the automobile and the cabin.

The rear wall 19 of the section 11 is a short, lower wall as illustrated in Figure 2 and has the upper edge thereof stopping level with the lower wall 15 of the section 10 so that when the sections are in the position illustrated in Figure 2, interiors of the sections 10 and 11 will be in free communication. The side walls 13 and 14 are each provided with a U-shaped forward edge 25 as illustrated in Figure 6 that receives a similar U-shaped edge 26 provided on each of the rear edges of the walls 16 and 17, thereby providing an over-lapping weatherproof joint along the forward edges of the walls 13 and 14 when the car cabin is in unfolded position as illustrated in Figures 1 and 2.

Figure 3:
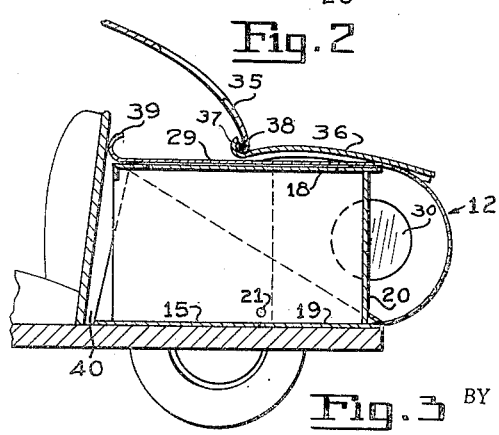
Figure 3 is a vertical cross-sectional view through the car cabin and the automobile illustrating the car cabin in folded position and telescoped into the baggage compartment of the automobile to illustrate the manner of daytime storage of the same when the cabin is not in use.

The top cover section 12 is provided, generally speaking, with relatively triangular shaped side walls 27 and 28, and a top wall 29. The forward portion of the top cover section 12 is rounded to provide for a general contouring of the rear portion of the car cabin when in folded condition, as illustrated in Figure 3, to carry forward the general streamline effect of the passenger vehicle. The side walls 27 and 28 are provided with windows 30.

The top cover section 12 is hinged to the side walls 13 and 14 of the U-shaped body section 15 by means of hinge pins 32, the side walls 27 and 28 of the cover section 12 being positioned adjacent the outer face of the walls 13 and 14 respectively so that the cover section 12 can telescope downwardly over the outside surfaces of the walls 13 and 14 respectively.

Also, when the section 11 is in the folded position illustrated in Figure 3, the top cover section 12 will also telescope downwardly over the outer surfaces of the walls 16 and 17 of the section 11 to thereby enclose these walls and also at the bottom wall 20 of the section 11, all as illustrated in Figure 3.

When the car cabin is in folded position as illustrated in Figure 3, the entire cabin forms a substantially rectangularly shaped package that can be slid into the baggage compartment of a passenger vehicle in telescoping fashion, only a portion of the car cabin extending beyond the rearmost part of the passenger vehicle.

If desired, the passenger vehicle 35 may have the opening to the baggage compartment specially constructed so that the opening will be the full width of the passenger vehicle, as illustrated in Figure 1. Under these circumstances the car cabin can be constructed to the same width as the width of the body of the passenger vehicle, thereby gaining additional interior space within the car cabin.

Figure 4:
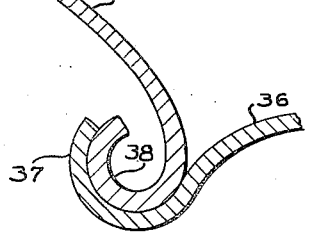
Figure 4 is an enlarged cross-sectional view of a type of weatherproof hinge joint between the turtle-back cover for the baggage compartment and the body of the automobile.

When the car cabin is placed within the baggage compartment of a passenger vehicle, the trunk cover or turtle-back cover 36 of the vehicle 35 will be retained in an open position. Therefore, a suitable weatherproof hinge joint may be provided between the trunk cover 36 and the body of the vehicle 35, as illustrated in Figure 4, wherein the turtle-back cover 36 carries a semi-circular flange 37 that wraps around a semi-circular flange 38 provided on the body of the vehicle 35. In this arrangement water running from the surface of the vehicle 35 will not pass through the hinge joint between the turtle-back cover 36 and the vehicle 35 that would enter the baggage compartment when the turtle-back cover is in the open position with the car cabin in place in the baggage compartment of the vehicle.

The top section 12 of the car cabin is provided with a flange 39 on the top wall 29 thereof, and along the rear edge thereof, that is adapted to engage the flange 37 of the hinge joint between the trunk 36 and the vehicle 35 to prevent the car cabin from being completely removed from the baggage compartment of the automobile when the car cabin is pulled outwardly of the baggage compartment preparatory to placing the section 11 into its vertical position illustrated in Figure 1 and the top section into its raised position, as illustrated in Figure 1. However, when it is desired to completely remove the car cabin from within the baggage compartment of the vehicle, the cabin may be rotated upwardly in a counter-clockwise direction when the flange 39 is against the hinge flange 37 until the top edge of the flange 39 passes beneath the extremity of the hinge flange 37 and thereby allow removal of the car cabin from within the baggage compartment of the vehicle.

When the car cabin is in extended position, illustrated in Figures 1 and 2, there is sufficient longitudinal length within the car cabin in conjunction with the interior space of the baggage compartment of the vehicle, to accommodate a full-length mattress or spring, the baggage compartment of the vehicle thus supplements and adds to the space provided in the car cabin and thus utilizes a part of the automobile as a part of the total enclosure.

When the car cabin illustrated in Figures 1 to 3 is positioned within the baggage compartment 40 of the vehicle 35, the open baggage compartment cover 36 may allow rain to enter the baggage compartment between the car cabin and the side edge of the baggage compartment. Therefore, to avoid any possibility of water entering the baggage compartment 40, flexible side curtains 41 may be removably attached to the edges 42 of the compartment cover 36 and the side edges 43 of the baggage compartment 40 by means of snap buttons 44.

In Figures 7, 8 and 9 there is illustrated a slightly modified arrangement of the car cabin, heretofore disclosed and described wherein the car cabin is adapted to be attached to a conventional passenger vehicle in the manner of an accessory. The car cabin of the modified arrangement also consists of three main sections of the general type referred to in Figure 1 with reference to the sections 10, 11 and 12, the modified arrangement consisting of the stationary body section 50, a vestibule section 51 and a top section 52. The three sections 50, 51 and 52 are movable relative to one another from the folded position illustrated in Figure 8 into an unfolded position in a manner that they will be arranged relative to one another in the same arrangement as illustrated with regard to the car cabin shown in Figures 1 to 3 inclusive. Therefore, the general arrangement of the car cabin illustrated in Figures 6 to 9 is the same as the general arrangement of the car cabin illustrated in Figures 1 to 3, the general construction and operation of the two forms of the device being substantially identical.

The car cabin illustrated in Figures 7 to 9 does have certain structural features that are not illustrated in Figures 1 to 3 in view of the attachment of the car cabin to a passenger vehicle in the manner of an accessory.

In the modified arrangement the stationary section 50 consists of the side walls 53 and 54 that are connected by a bottom wall 55. An angle member 56 connects the forward top edges of the side walls 53 and 54.

The side walls 53 and 54 are provided with flanges 57 and 58 respectively. The angle member 56 provides a flange extending across the top edge of the stationary section 50. A closure plate 59 is secured to the end wall of the stationary section 50, and is attached to the flanges 57 and 58 and the flange 60 of the angle section 56 by means of bolts 61. The closure plate 59 is provided with an opening 62 that has a contour that follows the contour of the rear portion of the body of the automobile, the body of the automobile being represented by the member 63 in Figures 7 and 9. The closure plate 59 may thus be removed from the main stationary section 50 and be replaced with another cover plate having a different opening therein to match the contour of another passenger vehicle. Thus, by providing cover plates having various contoured openings therein the car cabin of the modified arrangement shown in Figures 7 to 9 can be adapted for attachment to any passenger vehicle as an accessory. A weatherproof seal 64 is provided on the edge of the opening 62 in the plate 59.

The vestibule section 51 may be attached to the stationary section 50 and pivoted thereon in the same manner as the vestibule section 11 is attached to the stationary section 10 of the car cabin illustrated in Figure 1, or as illustrated in the modified arrangement shown in Figures 7 and 8, the vestibule section 51 may be attached to the stationary section 50 by means of a hinge 65 extending transversely across the sections and attached to the bottom wall 55 of the stationary section and the rear wall 66 of the vestibule section 51.

The vestibule section 51 is constructed in the same manner as the vestibule section 11 and has the side walls 67, a bottom wall 68, a front wall 69 and a top wall 70. The front wall 69 is provided with a door opening 71 carrying a door 72.

Interlocking joints 73 are provided between the side walls 67 of the vestibule section 51 and the side walls 53 and 54 of the stationary section 50 in the same manner as heretofore disclosed and described with regard to Figure 6.

The top cover section 52 may be attached to the side wall sections 53 and 54 of the stationary section 50 in the same manner as heretofore disclosed and described with regard to the manner of attachment of the top section 12 to the stationary section 10 of the car cabin illustrated in Figures 1 to 3, or as illustrated in the modified arrangement, the top cover section 52 may be attached to the stationary section 50 upon the angle member 56 by means of a hinge 74. The top cover section 52 is provided with the same type of interlocking joints between the side walls 75 of the top cover section 52 and the side walls 53 and 54 of the stationary section 50, as illustrated in Figure 5.

The car cabin of the modified arrangement illustrated in Figures 7 to 9 is adapted to telescope over the exterior of the rear portion of the body of a passenger vehicle so that the usual baggage compartment cover 76 is located within the interior of the car cabin. However, the interior of the baggage compartment 77 is open to the interior of the car cabin so that the space within the baggage compartment 77 supplements the space in the car cabin and can be utilized to partly receive a mattress or spring.

The car cabin of the modified arrangement is adapted to be attached to the rear end of the body 63 of the passenger vehicle, and be supported between the floor 78 of the baggage compartment and the bumper 79 on the passenger vehicle. The bottom wall 55 of the stationary section 50 of the car cabin is provided with a tongue 80 that may be secured to the floor 78 of the baggage compartment 77 by means of one or more bolts 81. U-shaped clip 82 extends through the bottom walll 55 of the stationary compartment 50 for attachment to the bumper 79 of the passenger vehicle. If necessary, a spacer member 83 may be provided between the bumper 79 and the bottom wall 55 to rigidly attach the stationary section 50 to the bumper 79.

In so far as the use of the car cabin illustrated in Figures 7 to 9 is concerned, it can be used in identically the same manner as that disclosed and described in Figures 1 to 3, the telescoping sections 51 and 52 of the car cabin being moved relative to one another and relative to the stationary section 50 to position the various sections in the arrangement illustrated in Figure 1 to thereby provide a horizontal section in the car cabin a sufficient length to receive a bed mattress or spring, and to provide for sufficient height in the vestibule section and the top section 52 so that persons may stand upright in the vestibule section 51.

While the apparatus disclosed and described herein constitutes a preferred form of the invention, which as shown is illustrated as being detachable from the automobile, yet it will be understood that the device is capable of mechanical alteration without departing from the spirit of the invention, and that such alteration includes a structure wherein the car cabin is constructed as a fixed part of the automobile, and that all other modifications that fall within the scope of the appended claims are intended to be included herein.

Having thus fully described my invention, what I claim as new and desire to secure by Letters Patent is:

1. A collapsible detachable car cabin for attachment on the rear of a passenger car body in cooperating alignment with the usual baggage compartment and forming therewith sleeping quarters comprising; a body section consisting of a bottom wall and spaced side walls forming a U-shaped section open at both ends and the top thereof; a movable vertically positionable vestibule section consisting of a bottom wall, side walls and a front wall extending upwardly from the bottom wall and terminating at the level of the upper edges of said side walls of the body section, a rear wall extending upwardly from said vestibule bottom wall only a part of the distance of the vestibule side walls; means hinging said vestibule section to said body section adjacent the upper edge of said vestibule rear wall at the end of the body section bottom wall; said vestibule section being at least partially telescopically received within said body section when hinged thereon; a rigid cover section consisting of side walls and a top wall and having an open bottom; said cover section extending over said body section and said vestibule section when said vestibule is in open position relative to said body section and having the portion thereof over the vestibule section of greater height than the portion over the body section; and hinge means hinging said cover section adjacent the end of said U-shaped body section opposite the end to which said vestibule section is hinged and at the upper edge thereof.

2. A collapsible detachable car cabin for attachment on the rear of a passenger car body in cooperating alignment with the usual baggage compartment and forming therewith sleeping quarters comprising; a body section consisting of a bottom wall and spaced side walls forming a U-shaped section open at both ends and the top thereof; a movable vertically positionable vestibule section consisting of a bottom wall, side walls and a front wall extending upwardly from the bottom wall and terminating at the level of the upper edges of said side walls of the body section, a rear wall extending upwardly from said vestibule bottom wall only a part of the distance of the vestibule side walls; means hinging said vestibule section to said body section adjacent the upper edge of said vestibule rear wall at the end of the body section bottom wall; said vestibule section being at least partially telescopically received within said body section when hinged thereon; a rigid cover section consisting of side walls and a top wall and having an open bottom; said cover section extending over said body section and said vestibule section when said vestibule is in open position relative to said body section and having the portion thereof over the vestibule section of greater height than the portion over the body section; hinge means hinging said cover section adjacent the end of said U-shaped body section opposite the end to which said vestibule section is hinged and at the upper edge thereof, and means for holding the car cabin in a predetermined extended position on the rear of a passenger car relative to the package compartment.

3. A collapsible detachable car cabin for attachment on the rear of a passenger car body in cooperating alignment with the usual baggage compartment and forming therewith sleeping quarters comprising; a body section consisting of a bottom wall and spaced side walls forming a U-shaped section open at both ends and the top thereof; a movable vertically positionable vestibule section consisting of a bottom wall, side walls and a front wall extending upwardly from the bottom wall and terminating at the level of the upper edges of said side walls of the body section, a rear wall extending upwardly from said vestibule bottom wall only a part of the distance of the vestibule side walls; means hinging said vestibule section to said body section adjacent the upper edge of said vestibule rear wall at the end of the body section bottom wall; said vestibule section having one position substantially parallel with the body section and partially telescoped therein and a second position in which it is placed substantially normal to the body section; a rigid cover section consisting of side walls and a top wall and having an open bottom; said cover section extending over said body section and said vestibule section; and hinge means hinging said cover section adjacent the end of said U-shaped body section opposite the end to which said vestibule section is hinged and at the upper end thereof; said cover section having one position in which it partially telescopically receives said body section and said vestibule section when said vestibule section is substantially parallel to said body section with the free end of said top section substantially enclosing the bottom wall of said vestibule section and a second position in which it is raised about the hinge for the same relative to said body section and supported by said vestibule section with the vestibule section normal to the body section whereby to provide standing height in the vestibule section.

4. A collapsible detachable car cabin for attachment on the rear of a passenger car body in cooperating alignment with the usual baggage compartment and forming therewith sleeping quarters comprising; a body section consisting of a bottom wall and spaced side walls forming a U-shaped section open at both ends and the top thereof; a movable vertically positionable vestibule section consisting of a bottom wall, side walls and a front wall extending upwardly from the bottom wall and terminating at the level of the upper edges of said side walls of the body section, a rear wall extending upwardly from said vestibule bottom wall only a part of the distance of the vestibule side walls; means hinging said vestibule section to said body section adjacent the upper edge of said vestibule rear wall at the end of the body section bottom wall; said vestibule section being at least partially telescopically received within said body section when hinged thereon; a rigid cover section consisting of side walls and a top wall and having an open bottom; said cover section extending over said body section and said vestibule section when said vestibule is in open position relative to said body section; said cover section being generally triangular in vertical cross-section and having the wider portion thereof positioned over the vestibule section; and hinge means hinging said cover section at the narrow end thereof adjacent the end of said U-shaped body section opposite the end to which said vestibule section is hinged and at the upper edge thereof.

5. A collapsible detachable car cabin for attachment on the rear of a passenger car body in cooperating alignment with the usual baggage compartment and forming therewith sleeping quarters comprising; a body section consisting of a bottom wall and spaced side walls forming a U-shaped section open at both ends and the top thereof; a movable vertically positionable vestibule section consisting of a bottom wall, side walls and a front wall extending upwardly from the bottom wall and terminating at the level of the upper edges of said side walls of the body section, a rear wall extending upwardly from said vestibule bottom wall only a part of the distance of the vestibule side walls; means hinging said vestibule section to said body section adjacent the upper edge of said vestibule rear wall at the end of the body section bottom wall; said vestibule section being at least partially telescopically received within said body section when hinged thereon; a rigid cover section consisting of side walls and a top wall and having an open bottom; said cover section extending over said body section and said vestibule section when said vestibule is in open position relative to said body section and having the portion thereof over the vestibule section of greater height than the portion over the body section; hinge means hinging said cover section adjacent the end of said U-shaped body section opposite the end to which said vestibule section is hinged and at the upper edge thereof, said car cabin being constructed and arranged to telescopically receive the baggage compartment portion of the body of a passenger car within said body section and said vestibule section as arranged in closed position; and means for releasably attaching the car cabin in position on the rear of a passenger car relative to the baggage compartment with the baggage compartment telescopically received within the car cabin.

6. A collapsible detachable car cabin for attachment on the rear of a passenger car body in cooperating alignment with the usual baggage compartment and forming therewith sleeping quarters comprising; a body section consisting of a bottom wall and spaced side walls forming a U-shaped section open at both ends and the top thereof; a movable vertically positionable vestibule section consisting of a bottom wall, side walls and a front wall extending upwardly from the bottom wall and terminating at the level of the upper edges of said side walls of the body section, a rear wall extending upwardly from said vestibule bottom wall only a part of the distance of the vestibule side walls; means hinging said vestibule section to said body section adjacent the upper edge of said vestibule rear wall at the end of the body section bottom wall; said vestibule section being at least partially telescopically received within said body section when hinged thereon; a rigid cover section consisting of side walls and a top wall and having an open bottom; said cover section extending over said body section and said vestibule section when said vestibule is in open position relative to said body section and having the portion thereof over the vestibule section of greater height than the portion over the body section; hinge means hinging said cover section adjacent the end of said U-shaped body section opposite the end to which said vestibule section is hinged and at the upper edge thereof, said car cabin being constructed and arranged to telescopically receive the baggage compartment portion of the body of a passenger car within said body section and said vestibule section as arranged in closed position; means for releasably attaching the car cabin in position on the rear of a passenger car relative to the baggage compartment with the baggage compartment telescopically received within the car cabin, said body section having a wall at the end thereof adjacent to which the top section is hinged which has a contoured opening therein to telescopically receive the passenger car body; and a weatherproof seal carried on said last-mentioned wall for engaging the car body to prevent entry of weather into the car cabin.

7. A collapsible detachable car cabin for attachment on the rear of a passenger car body in cooperating alignment with the usual baggage compartment and forming therewith sleeping quarters comprising; a body section consisting of a bottom wall and spaced side walls forming a U-shaped section open at both ends and the top thereof; a movable vertically positionable vestibule section consisting of a bottom wall, side walls and a front wall extending upwardly from the bottom wall and terminating at the level of the upper edges of said side walls of the body section, a rear wall extending upwardly from said vestibule bottom wall only a part of the distance of the vestibule side walls; means hinging said vestibule section to said body section adjacent the upper edge of said vestibule rear wall at the end of the body section bottom wall, said vestibule section being at least partially telescopically received within said body section when hinged thereon; a rigid cover section consisting of side walls and a top wall and having an open bottom; said cover section extending over said body section and said vestibule section when said vestibule is in open position relative to said body section and having the portion thereof over the vestibule section of greater height than the portion over the body section; hinge means hinging said cover section adjacent the end of said U-shaped body section opposite the end to which said vestibule section is hinged and at the upper edge thereof, said car cabin being constructed and arranged to telescopically receive the baggage compartment portion of the body of a passenger car within said body section and said vestibule section as arranged in closed position; means for releasably attaching the car cabin in position on the rear of a passenger car relative to the baggage compartment with the baggage compartment telescopically received within the car cabin, said body section having a removable wall at the end thereof adjacent to which the top section is hinged which has a contoured opening therein to telescopically receive the passenger car body; and a weatherproof seal carried on said last-mentioned wall for engaging the car body to prevent entry of weather into the car cabin.

LE ROY SMELKER.

REFERENCES CITED

The following references are of record in the file of this patent:

UNITED STATES PATENTS

| Number | Name | Date |
| --- | --- | --- |
| 1,392,011 | Hedberg | Sept. 27, 1921 |
| 1,424,222 | Tuttle | Aug. 1, 1922 |
| 1,460,464 | Wilson | July 3, 1923 |
| 1,548,527 | Hillgren | Aug. 4, 1925 |
| 1,629,403 | Marwahn | May 17, 1927 |
| 1,748,809 | Verdini | Feb. 25, 1930 |
| 1,755,543 | Hill | Apr. 22, 1930 |
| 1,861,906 | Bradburn | June 7, 1932 |
| 2,173,076 | Stetson | Sept. 12, 1939 |
| 2,188,545 | Smelker | Jan. 30, 1940 |